US006834546B2

(12) United States Patent
Edvardsson

(10) Patent No.: US 6,834,546 B2
(45) Date of Patent: Dec. 28, 2004

(54) DEVICE AND METHOD IN A LEVEL GAUGING SYSTEM

(75) Inventor: Kurt Olov Edvardsson, Täby (SE)

(73) Assignee: Saab Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 10/378,072

(22) Filed: Mar. 4, 2003

(65) Prior Publication Data

US 2004/0173020 A1 Sep. 9, 2004

(51) Int. Cl.[7] ............................................. G01F 23/284
(52) U.S. Cl. ................... 73/290 V; 73/290 R; 340/612; 340/618
(58) Field of Search ......................... 73/290 V, 290 R; 340/612, 618

(56) References Cited

U.S. PATENT DOCUMENTS

| | | | | |
|---|---|---|---|---|
| 3,593,224 A | * | 7/1971 | Eggers et al. .................. | 333/252 |
| 3,728,650 A | * | 4/1973 | Forman et al. .................. | 333/252 |
| 3,737,812 A | * | 6/1973 | Gaudio et al. .................. | 333/32 |
| 4,358,744 A | * | 11/1982 | Tikes ............................ | 333/33 |
| 4,720,693 A | * | 1/1988 | Tikes ............................ | 333/252 |
| 4,797,597 A | * | 1/1989 | Bostrom ....................... | 315/39 |
| 5,043,629 A | * | 8/1991 | Doane ............................ | 315/5 |
| 5,471,182 A | | 11/1995 | Rivera et al. .................. | 333/252 |
| 5,827,985 A | * | 10/1998 | Grieger et al. ................ | 73/866.5 |
| 5,872,494 A | * | 2/1999 | Palan et al. ................... | 333/252 |
| 5,992,251 A | * | 11/1999 | Grieger et al. ................ | 73/866.5 |
| 6,019,007 A | * | 2/2000 | Grieger et al. ................ | 73/866.5 |
| 6,393,909 B1 | | 5/2002 | Fahrenbach et al. .......... | 73/290 V |
| 2001/0047685 A1 | | 12/2001 | Lubbers ........................ | 73/290 R |

FOREIGN PATENT DOCUMENTS

| | | |
|---|---|---|
| DE | 19950 429 | 4/2001 |
| EP | 0 943 902 | 9/1999 |
| EP | 1 083 414 | 3/2001 |
| WO | WO 97/12211 | 4/1997 |

OTHER PUBLICATIONS

Marcuwicz, Waveguide Handbook, Field Representation in Uniform Waveguides, pp. 2–5 and 72–81 (1951 and 1986).
R. Collin, Field Theory of Guided Waves, pp. 173, 329–336, 411–412 (1991).
R. Johnson, Antenna Engineering Handbook, pp. 42–20 to 42–29 (1993).

\* cited by examiner

*Primary Examiner*—Hezron Williams
*Assistant Examiner*—Rodney Frank
(74) *Attorney, Agent, or Firm*—Westman, Champlin & Kelly, P.A.

(57) ABSTRACT

The invention relates to a pressure sealing device and a method for decreasing the cut-off frequency in such a pressure sealing device used in a radar level gauging system for gauging a filling level of a product kept in a container, the sealing device comprises a waveguide for feeding microwaves in at least one of the following mode types: transverse electric mode, transverse magnetic mode or hybrid mode. Said waveguide is sealed by a dielectric material. A center conductor is arranged at least partially within said dielectric material.

35 Claims, 13 Drawing Sheets

DEVICE AND METHOD IN A LEVEL GAUGING SYSTEM

BACKGROUND OF THE INVENTION

1. Field of the Invention

The present patent application relates to the field of pressure sealing devices in radar level gauging systems, and particularly to a pressure sealing device allowing for a reduction of waveguide diameter but with maintained cut-off frequency as well as a method for such sealing.

2. Description of the Related Art

Radar level gauges are commonly used today for measuring the level of the surface of a product kept in a container, such as a tank. These radar level gauges must be able to function under very different conditions. The products kept in the containers could be a lot of different products, such as petroleum refinery products, liquid gases and other chemical compounds. Thus, pressures and temperatures in the containers can have a wide range of values. Typical pressures can be 4–10 MPa and typical temperatures can be within the range of −40° C.–+200° C., but pressures and temperatures outside these values are also possible.

The level gauges typically comprise an antenna being fed by a waveguide, e.g. antenna using a horn fed by a circular waveguide. Other antennas in use are a parabolic antenna fed by a horn via a waveguide, a dielectric rod antenna or an array antenna fed by waveguide. Usually the waveguide and part of the horn is filled by a dielectric material an sealed by one or more O-rings. The dielectric material is arranged to provide a barrier for vapors or liquid that are in the interior of the container and to prevent the vapors from being discharged to the exterior. Since the containers often contains chemicals, the dielectric material used is preferably PTFE (Polytetraflourethylene) which simplifies the judgement of chemical compatibility. PPS (Polyphenylenesulphide) is another possible material for slightly higher temperatures, but having slightly less chemical resistance. For temperatures approaching 200° C. the mechanical properties of PTFE are severely degraded, so the combination of high pressure and temperature require a good design of the pressure sealing enabling a good lateral fixing of the dielectric material. Still higher temperatures obviously needs other materials like quartz or ceramic materials, and by such materials the shape must be matched accordingly. Another type of material used as waveguide sealings is glass. In all those cases the waveguide is used to make the microwave transmission smooth and free of reflections in order to improve radar measuring accuracy but the sealing of the waveguide is an important part, not the least at high pressures. be matched accordingly. Another type of material used as waveguide sealings is glass. In all those cases the waveguide is used to make the microwave transmission smooth and free of reflections in order to improve radar measuring accuracy but the sealing of the waveguide is an important part, not the least at high pressures.

One prior art approach used so far is shown in FIG. 2. This prior art pressure sealing comprises a plug made of a dielectric material (e.g. PTFE), which is filling a waveguide feeding microwaves to a horn antenna made of a metallic material. The antenna comprises a flange arranged to mount the antenna on the roof of the container. The dielectric plug and the horn antenna are partly exposed to the container environment. Radar electronics (shown schematically in FIG. 1) is feeding the antenna through the waveguide, and is located outside the container. The dielectric plug is attached to a metallic short flange, which is secured to the horn antenna and flange by threads or similar elements. The plug is secured to the flange by a number of small circumferential ridges enabling a good lateral fixing of the plug. Furthermore, one or more sealing elements (not shown), such as O-rings, are arranged between the plug and the horn antenna.

However, this prior art approach decreases the diameter of the waveguide by the small circumferential ridges. The smaller diameter increases the cut-off frequency in a non-desired way, and the diameter outside the narrower section is already made as small as possible and the function of a level gauging system needs a rather wide bandwidth. Thus, there is little space for a narrower section to obtain a possibility to withstand typical mechanical forces caused by the container pressure. This type of sealing is adequate and widely used for container sealings at moderate pressures and temperatures.

Furthermore, different types of containers and gauging in different situations require use of different frequencies. Typical frequencies used in radar level gauges are 6, 10 or 26 GHz. Supposing that two versions of the electronics is available (such as 6 and 26 GHz) for use in different situations, it would be practical to have the same pressure sealing with a common type of antenna. With the same pressure sealing it would be possible to change frequency after the first installation and it would also simplify the logistics. Information on operation conditions may be scarce in advance so both the cases that the liquid is covered by foam, when 26 GHz will expect problems, and that the container contains more structures than expected, and a 6 GHz TX may expect problems, will occur. One practical arrangement in such level gauges is to split the gauge in two parts, one of which is a pressure sealing and the other an electronic unit in a separate enclosure. The pressure sealing, including the antenna, is mounted on a port in the container and will seal the container. The radar electronics enclosure including the waveguide feeding is mounted on top of the pressure sealing and may be mounted or removed without opening the container.

One problem with an arrangement where the same pressure sealing is used in a dual band system, is that the diameter of a waveguide for feeding the low frequency (6 GHz) must be considerably larger than the diameter of a waveguide feeding the high frequency (26 GHz). In case the waveguides are filled by PTFE, the diameter for the low frequency will be 24 –25 mm and the diameter for the high frequency 6 mm. Thus, in order to use the same pressure sealing, a waveguide having the larger diameter must be used. But when the high frequency propagates in a waveguide having a larger diameter than needed, a number of non-desired waveguide modes can propagate and great caution must be taken to avoid excitation of them.

SUMMARY OF THE INVENTION

Accordingly, it is an object of the present invention to provide an improved pressure sealing device allowing for an improved mechanical attachment of the dielectric waveguide filling material by a locally smaller diameter of the waveguide without increasing the cut-off frequency and resulting in a decreased mechanical strain and a reduced number of non-desired waveguide modes.

This object is achieved through providing a coaxially arranged conducting cylinder in the waveguide over a limited path along the waveguide.

Another object of the invention is to provide a method for improving the mechanical attachment of the dielectric waveguide filling material by a locally smaller diameter of the waveguide without increasing the cut-off frequency and which results in a decreased mechanical strain and a reduced number of non-desired waveguide modes.

This object is achieved through a method of providing a coaxially arranged conducting cylinder in the waveguide over a limited path along the waveguide.

A pressure sealing device and a method for decreasing the cut-off frequency in a pressure sealing device has been invented, where the diameter of the waveguide can be made much smaller than before due to a center conductor provided in the waveguide. The possibility to decrease the diameter is applied over a part along the waveguide (such as λ/2) which enables the creation of shoulders or conical parts supporting a considerable mechanical force along the waveguide caused by a pressure in the container. The approach according to the present invention being advantageous in comparison to the previously discussed prior art approach, which increases the cut-off frequency in a non-desired way. The present invention eliminates this restriction of such a prior art approach through enabling a smaller diameter of the waveguide with maintained cut-off frequency.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
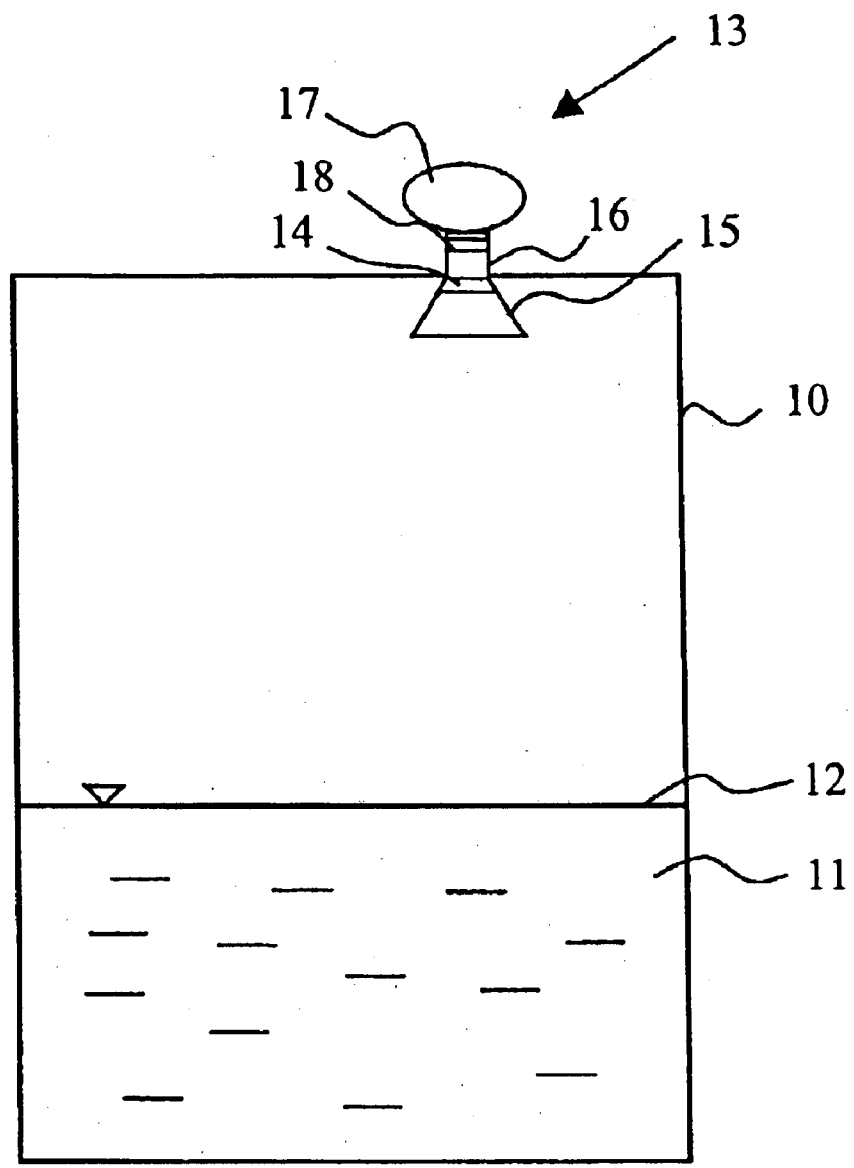
FIG. 1 is a schematic representation of a container in which a radar level gauging system having a pressure sealing according to prior art or to the present invention is installed.
Figure 2:
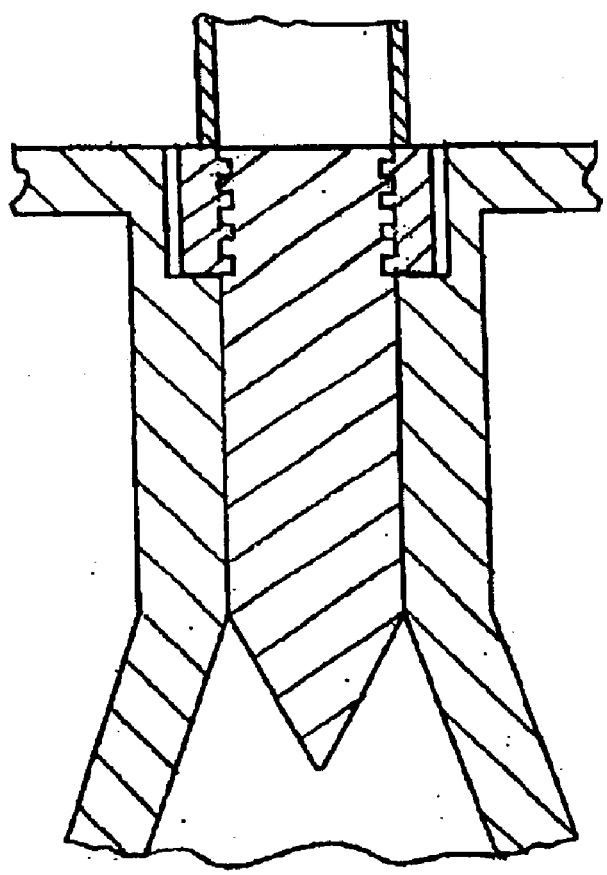
FIG. 2 shows an axial cross-section of a prior art pressure sealing for a waveguide.

Referring to FIG. 1, a container indicated generally at 10 is filled with a product 11, the height or level of which is to be determined utilizing a radar level gauge 13, which measures the distance to a surface 12 of the product 11. The container 10 may e.g. be a tank on a ship, in a process industry or in an oil refinery. The product may be a liquid such as oil, a gas, pulverized solid material such as sand or stone powder or other chemical compounds. The radar level gauge 13 is mounted on a container port at the top of the container 10 and is sealed relative thereto. The radar level gauge 13 comprises a horn antenna 15 which transmits microwaves towards the product surface 12 and receives reflected microwaves from the product surface 12 to provide an indication of the level of the product 11 kept in the container 10. As a remark, the radar level gauge 13 measures the distance from the top to the surface 12 of the product 11, but as the container height is known it is straightforward to recalculate this distance to the level which is the height of the product 11.

The radar level gauge 13 further comprises a waveguide 16 feeding microwaves between the horn antenna 15 and an electronic unit 17 in which the microwaves are generated and in which received microwaves are converted to electrical signals. The electronic unit 17 that is used for transmitting microwaves and receiving the reflected microwaves is well known and is shown only schematically. The radar level gauge further comprises a communication interface to be able to send and receive information, e.g. send the received microwaves signals to a signal-processing unit. A sealing plug 14 made of a dielectric material is arranged to seal the waveguide 16 from the container atmosphere and in case the electronic unit 17 includes an explosionproof (flameproof) enclosure there is also a flameproof plug 18 provided.

Figure 3:
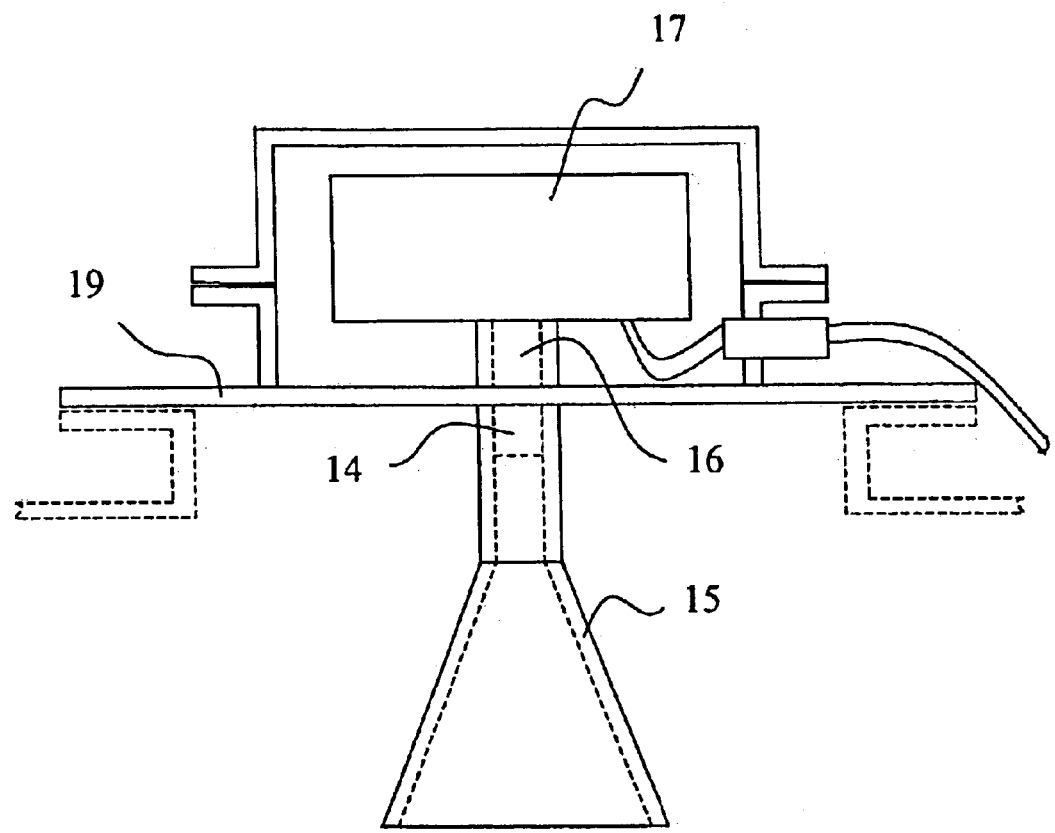
FIG. 3 is a schematic view of a radar level gauge according to prior art or the present invention.

A typical design of a radar level gauge 13 where the electronic unit 17 (of any kind) is connected to the horn antenna 15 via the waveguide 16, is shown in FIG. 3. The horn antenna 15 is mounted (welded) to a flange 19, which is attached to the container port at the top of the container 10 by means of e.g. bolts (not shown). The waveguide 16 passes through the flange 19 and is sealed relative thereto. The sealing plug 14 made of a dielectric material is arranged to seal the waveguide 16 from the container atmosphere. The waveguide 16 is preferably provided with a joint, allowing the electronic unit 17 to be exchanged without opening the container, inside which there often is a high pressure and/or dangerous substances. The electronic unit 17 is connected to a cable and is also preferably protected by a cover to i.e. protect the waveguide connection and the cable connection from weather influences.

The propagation in closed waveguides of any cross-section can be described in various waveguide modes, see any textbook on this subject such as Marcuwicz: "Waveguide handbook", [McGraw Hill 1951 p 3–6 and 72–80 or Peter Peregrinus 1986], R. Collin: Field Theory of guided waves, [IEEE 1991 p 173, 329–337 and 411–412] or R Johnson: Antenna engineering handbook [McGraw Hill 1993 p 42–20 to 42–29], which are classified in 4 groups:

TEM-modes with no field component along the waveguide. Two or more conductors are required with a coaxial line as the by far most common example. No lower cut-off frequency and the practical use is restricted to frequencies where no other modes can propagate (i.e. a practical upper frequency limit);

Transverse electric modes (abbreviated TE-modes or H-modes) with no electric field along the waveguide. The lowest mode in most hollow waveguides are of this group like $H_{11}$ in circular waveguides and $H_{10}$ in rectangular waveguides. H-modes can exist in structures with more than one conductor too but will have quite other properties than a TEM-mode in the same mechanical structure;

Transverse magnetic modes (abbreviated TM-modes or E-modes) belong to the higher modes in any hollow waveguide; and Hybrid modes (HE-modes) can exist in a hollow waveguide if the material is non-homogenous such as the case where a part of the cross-section is filled with one dielectric material and the rest with another material.

The mode used in the present invention may be the transverse electric mode, the transverse magnetic mode or the hybrid mode, but is in the preferred embodiment of the invention the transverse electric mode (H-mode). In contrast to a standard coaxial line, the TEM-mode is not used in the characteristic application of the invention.

Figure 4:
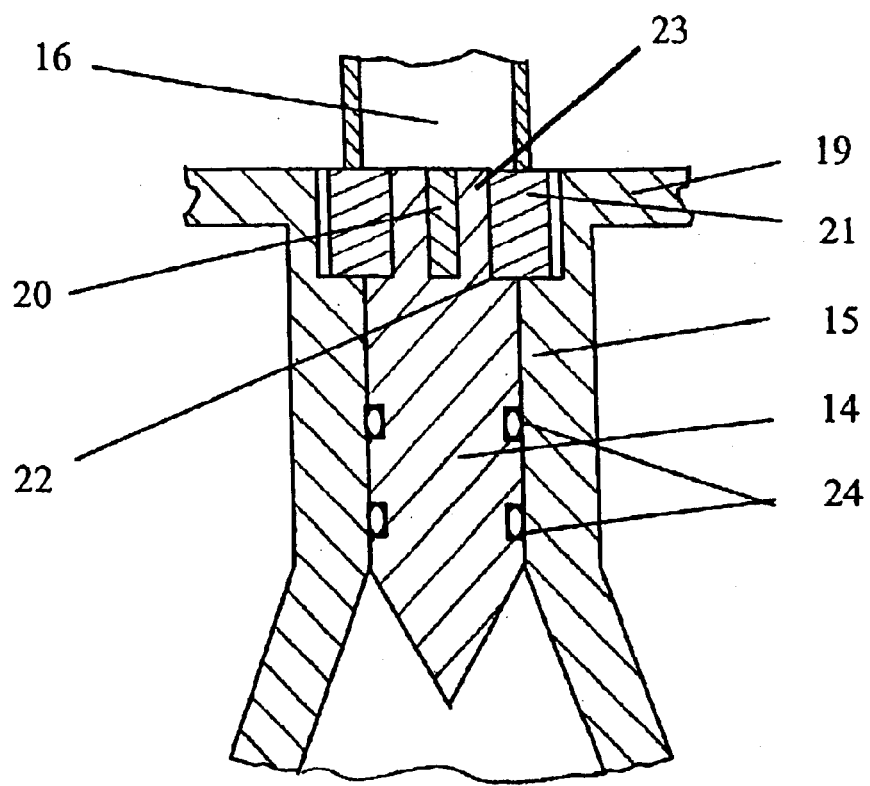
FIG. 4 shows an axial cross-section of an inventive pressure sealing according to a general embodiment of the present invention.

In FIG. 4 a general embodiment of a pressure sealing according to the present invention is shown. The pressure sealing comprises one dielectric plug 14 filling the waveguide, which is feeding microwaves to the horn antenna 15, preferably made of a metallic material. The antenna 15 comprises a flange 19 arranged to mount the antenna 15 on the roof of the container 10 (shown in FIG. 3). The dielectric plug 14 is arranged to provide a barrier for vapors or liquid that are in the interior of the container 10 and to prevent the vapors from being discharged to the exterior. The dielectric material is in the preferred embodiment PTFE or PPS. For temperatures approaching 200° C. the mechanical properties of PTFE and/or PPS are severely degraded, so the pressure sealing is provided with an attachment flange 21. The attachment flange 21 may be secured to the horn antenna 15 by means of threads or similar and will provide a section 23 of the waveguide 16 having a smaller diameter than the rest of the waveguide 16 allowing a rather wide shoulder 22 to support an axial force on the plug 14 due to a high pressure in the container 10. The section having a smaller diameter is henceforward called the narrower section 23.

Figure 5:
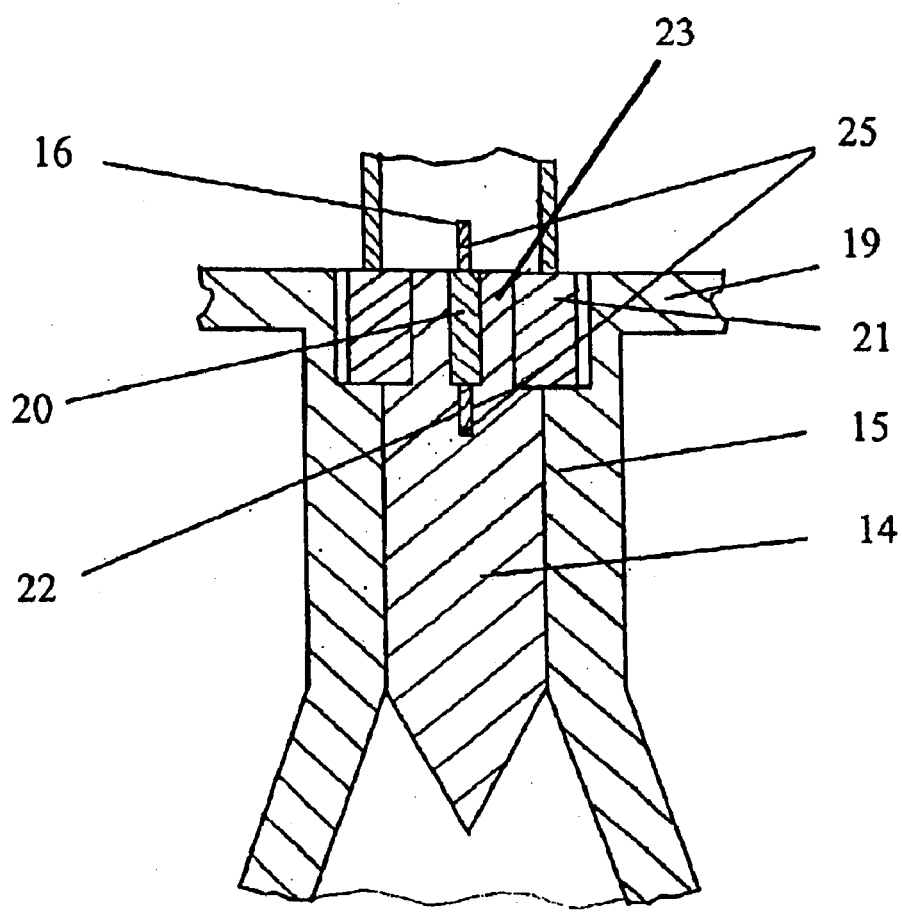
FIG. 5 shows an axial cross-section of an inventive pressure sealing according to one embodiment of the present invention.

The waveguide 16 is at the narrower section 23 provided with a center conductor 20, which may, for example, be a metallic pin inserted in a drilled coaxial opening in the dielectric plug 14. The center conductor 20 may be a homogenous cylinder made of a metallic material or having just the envelope surface made of a metallic material. The center conductor 20 has essentially the same length as the narrower section 23, which in the preferred embodiment of the present invention is $\lambda/2$ of the actual waveguide wavelength. The waveguide 16 is in the preferred embodiment further provided with one or more sealings, such as O-rings 24 between the dielectric plug 14 and the horn antenna 15. In the preferred embodiment of the present invention, the two O-rings 24 are arranged $\lambda/4$ apart to minimize the reflection from them. An additional or alternative sealing device can be located at the shoulder 22. Further, the waveguide 16 comprises in a preferred embodiment a joint between the flange 19 and the upper waveguide 16, since the sealing of the container must remain even if the electronic unit is removed. Referring now to FIG. 5, which shows another embodiment of the present invention having an improved bandwidth. The pressure sealing comprises one dielectric plug 14 filling at least a part of the waveguide 16, which is feeding microwaves to the horn antenna 15. The antenna 15 comprises a flange 19 arranged to mount the antenna 15 on the roof of the container 10 (shown in FIG. 1). The pressure sealing is provided with an attachment flange 21, which may be secured to the horn antenna 15 by means of threads or similar and will provide the narrower section 23 of the waveguide 16 allowing a rather wide shoulder 22 to support an axial force on the plug 14 due to high pressure in the container 10. The waveguide 16 is at the narrower section 23 provided with the center conductor 20, which has essentially the same length as the narrower section 23, preferably $\lambda/2$ of the actual waveguide wavelength. Two impedance transformer sections 25 are arranged at the opposing ends of the center conductor 20 and they are in a preferred embodiment of the present invention $\lambda/4$ wavelengths long each greatly improving the bandwidth.

Figure 6:
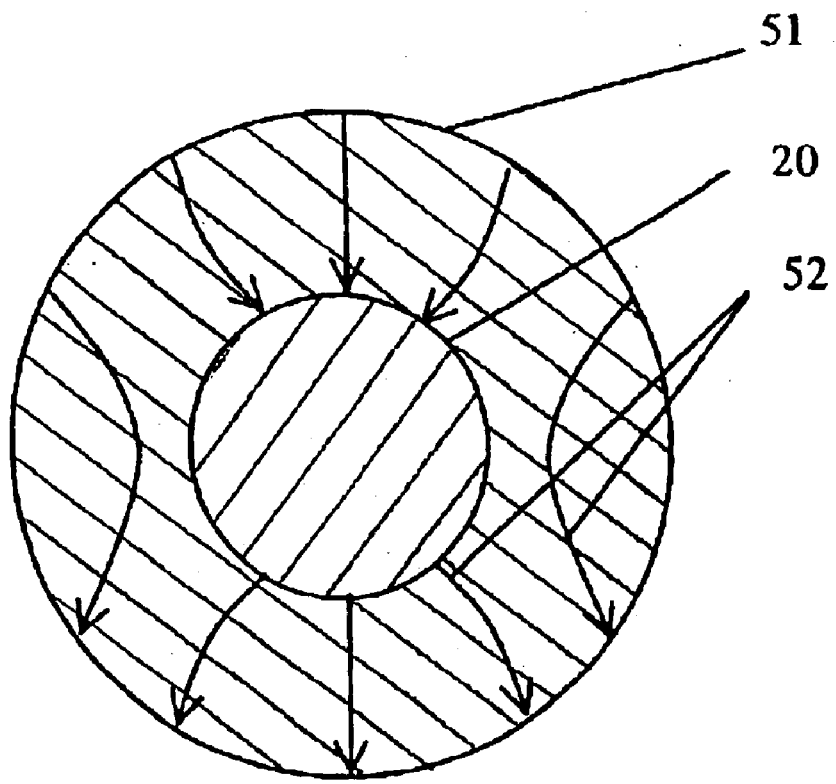
FIG. 6 is a radial cross-section of an inventive circular waveguide showing the electrical field lines.

FIG. 6 shows schematically electrical field lines 52 in an inventive circular waveguide 51 carrying a $H_{11}$ waveguide mode according to a preferred embodiment of the present invention. The center conductor 20 is coaxially arranged in the circular waveguide 51, but in spite of the geometrically similarity this waveguide is by no means acting as a coaxial transmission line. The field pattern 52 is modified by the cylindrical center conductor 20 and the influence on the cut-off frequency of fundamental mode and higher modes can be calculated.

Figure 7:
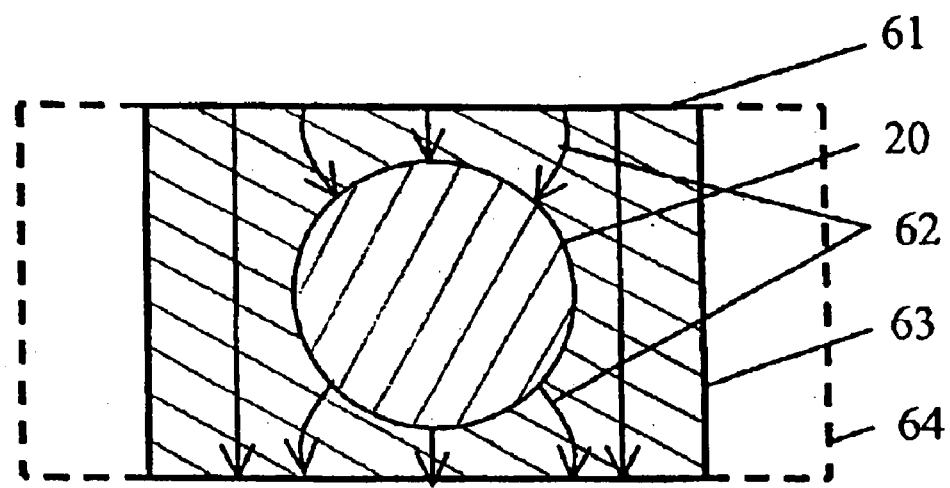
FIG. 7 is a radial cross-section of an inventive rectangular waveguide showing the electrical field lines.

FIG. 7 shows schematically electrical field lines 62 in an inventive rectangular waveguide 61 carrying a $H_{10}$ waveguide mode according to another embodiment of the present invention. The center conductor 20 is coaxially arranged in the rectangular waveguide 61 and over a limited part of its lengths, such as $\lambda/2$ of the actual waveguide wavelength. The electrical field pattern 62 is modified by the cylindrical center conductor 20 and the influence on cut-off frequency of fundamental mode and higher modes can be calculated. The function resembles that of a ridge waveguide but with "inverted ridges". The waveguide 61 is more narrow where the center conductor 20 is located ($\lambda/2$ long), which is indicated by the solid lines 63 in FIG. 7. The waveguide 61 is wider, indicated by the dashed lines 64, where there is no center conductor 20 in order to maintain the same cut-off frequency. This more narrow section allows the dielectric filling material to be secured and to withstand large forces caused by the pressure inside the container.

FIGS. 6 and 7 show two different cross-sections of a waveguide, circular an rectangular. The person skilled in the art realizes that there are other shapes possible than a circular or a rectangular cross-section. A circular waveguide is used in the preferred embodiment due to sealing reasons, since a circular cross-section is much easier to seal than a rectangular cross-section. On the other hand, a circular waveguide has a rather poor gross bandwidth of 1:1.31 or 26% for single mode propagation, which can be compared to 1:2 for a rectangular waveguide or 1:4 for a ridge waveguide which should include system bandwidth (10–15%) and maybe 10% margin to the cut-off frequency. In this context, the term "maintaining the cut-off frequency" does not necessarily mean exactly the same cut-off frequency, but could be the cut-off frequency ±5%.

Figure 8:
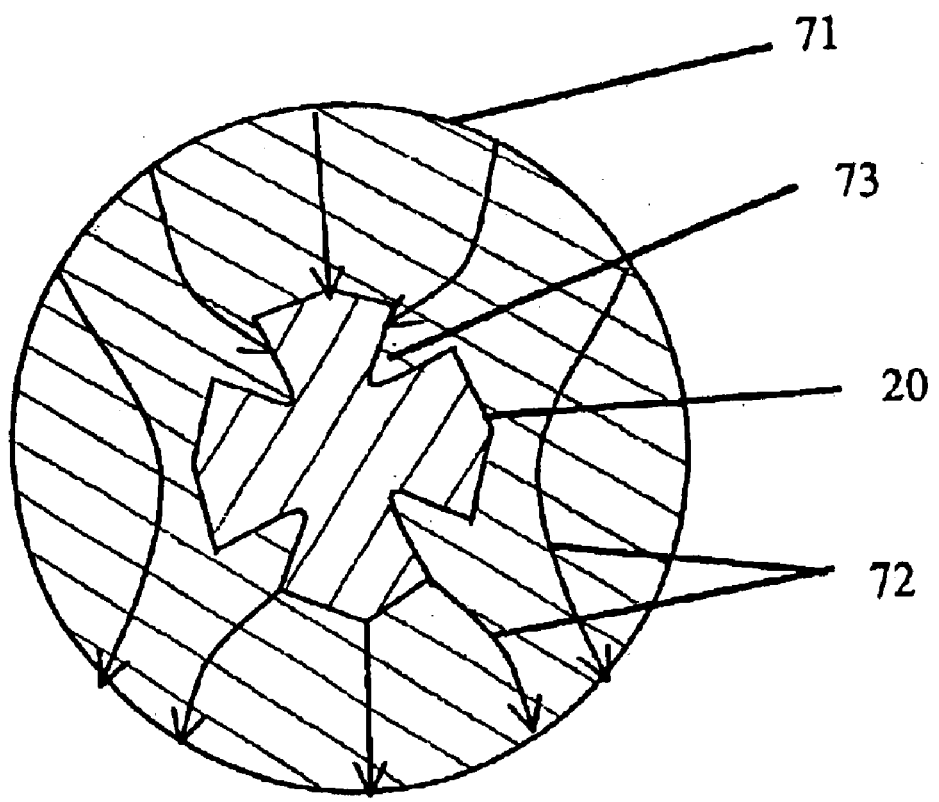
FIG. 8 is a radial cross-section of an inventive circular waveguide provided with grooves showing the electrical field lines

The center conductor 20 is in the preferred embodiment of the present invention made as a smooth cylinder. As can be seen from FIG. 8, the center conductor 20 may, however, be provided with grooves 73 to increase the lateral inductance and thus make it possible to get the same effect by a conductor having a smaller diameter. Thus, FIG. 7 shows schematically electrical field lines 72 in an inventive circular waveguide 71 carrying a $H_{11}$ waveguide mode according to another embodiment of the present invention. The center conductor 20 is coaxially arranged in the circular waveguide 71, but in spite of the geometrically similarity this waveguide is by no means acting as a coaxial transmission line. The field pattern 72 is modified by the cylindrical center conductor 20 and the influence on the cut-off frequency of fundamental mode and higher modes can be calculated. The center conductor 20 is in this embodiment provided with four grooves 73, but other numbers of grooves are of course possible.

The inventive pressure sealing is based on the observation that a coaxial structure used as a waveguide in the $H_{11}$ mode (i.e. not used as a coaxial line) has a lower cut-off frequency than the same pipe without the center conductor. This is illustrated by the diagram shown in FIG. 9, giving the diameters for a number of coaxial structures all having the same designed cut-off frequency for their $H_{11}$ mode. The horizontal axis is the normalized exterior diameter at the narrower section, which is 1 for the empty circular waveguide. The normalized diameters (exterior/interior) are on the vertical axis and by inserting the center conductor and letting its diameter grow, the exterior diameter can be made smaller if all changes are made under constant cut-off frequency for the $H_{11}$ mode. The impedance of the coaxial $H_{11}$, mode is decreasing as indicated in the diagram, so some means are necessary to keep the microwave impedance matching. Impedance is in this context understood as the squared voltage divided by the transported power. First, the narrower section should be made $\lambda/2$ wavelengths long. That gives a match but possibly a narrow band one. By adding $\lambda/4$ transformer sections in the structure that can be improved.

Figure 9:
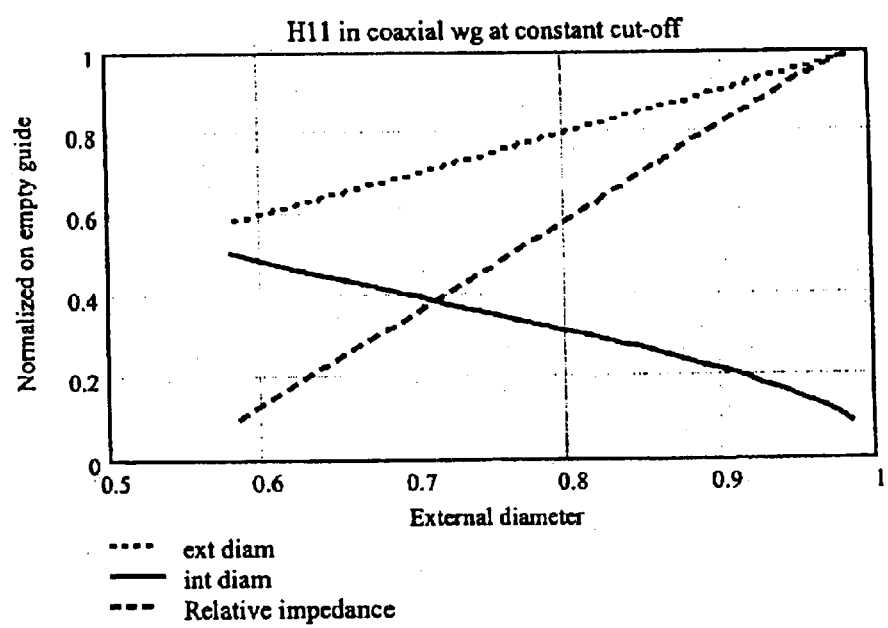
FIG. 9 is a diagram showing the relative impedance in an inventive waveguide at different diameters having the same cut-off frequency.

Three examples can be read from the diagram shown in FIG. 9, giving 90%, 80% and 70% of the original diameter at the narrower section. With the smallest diameter, 51% of the surface, remaining for the shoulder 22 shown in FIG. 4, can take the pressure which should allow a pressure of for instance 4 Mpa with good margin. Next higher modes have been tested for the three cases above and are working for the two lowest ($H_{21}$ and $E_{01}$).

Figure 10:
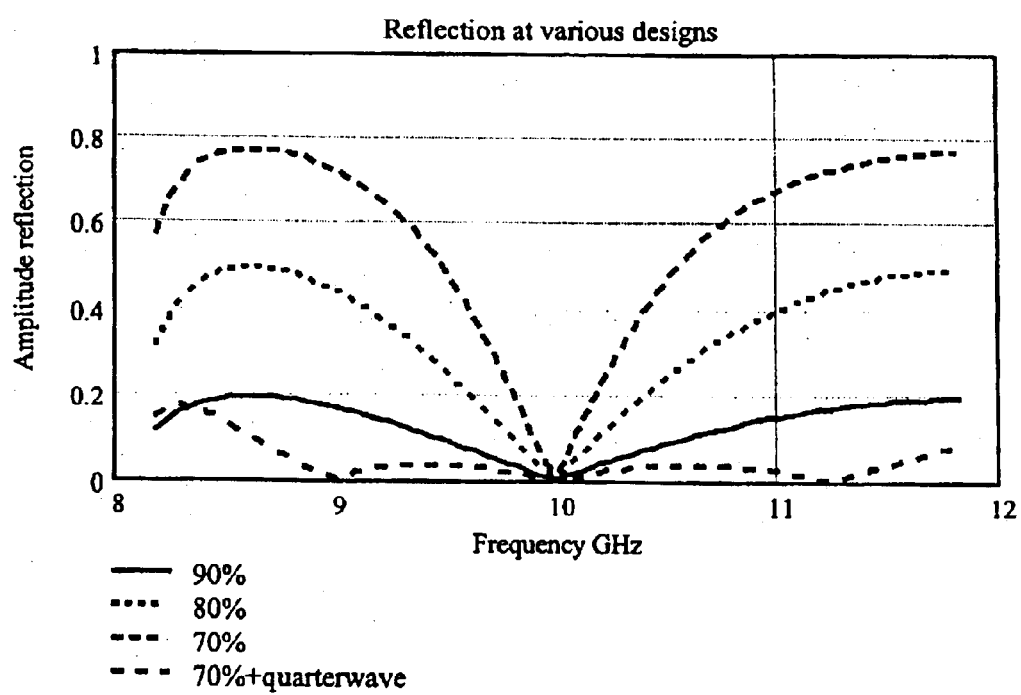
FIG. 10 is a diagram showing the reflections at various designs.

The match is illustrated by the curves in the diagram shown in FIG. 10, where the three cases above (90%, 80% and 70% diameter) and the case with 70% diameter plus two $\lambda/4$-transformer sections included are calculated for mismatch. The 90% narrower section gives low mismatch, but also the 80% narrower section gives a standing wave ratio below 1:1.5 (reflection factor 0.2) over ±12% bandwidth. With the 70% narrower section including $\lambda/4$-transformer sections (70% impedance) the mismatch is negligible over the full ±20% bandwidth. Thus a good match as well as a wide shoulder to support the axial pressure are obtained in spite of the rather big intrusion.

Figure 11:
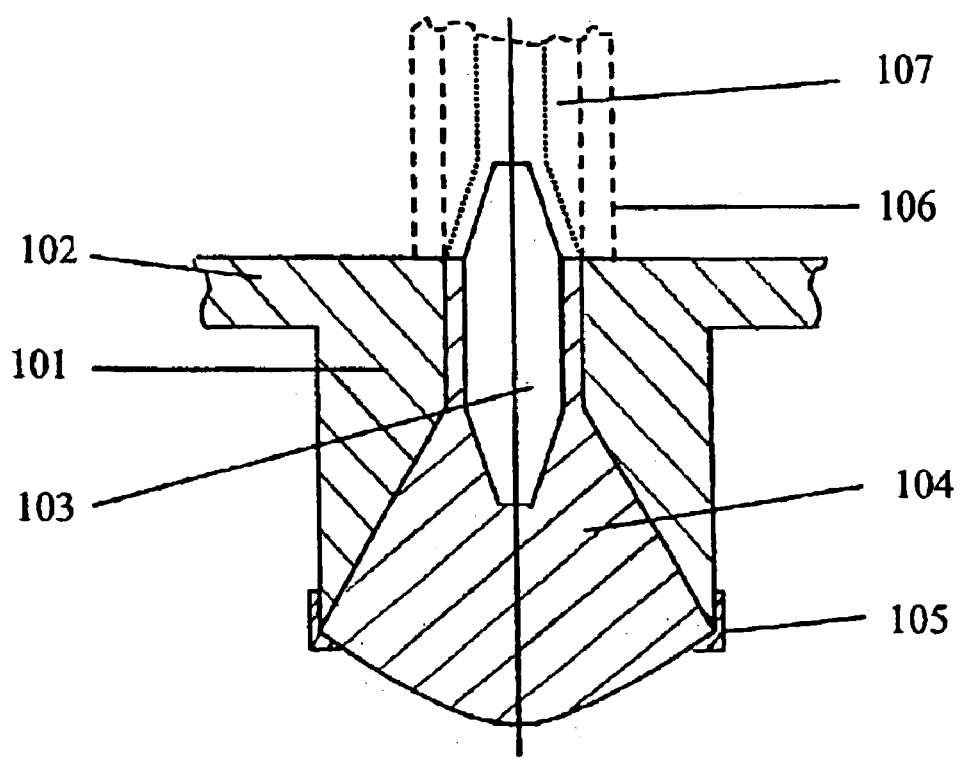
FIG. 11 shows an axial cross-section of an inventive pressure sealing implemented in a dual band system.

The inventive pressure sealing is in another preferred embodiment used in a dual band radar level gauge, wherein the level gauge is arranged to transmit and receive microwaves on at least a first and a second frequency band, and wherein the center frequency of the second frequency band is at least 1.5 times higher, preferably 2 times higher, than the frequency center of the first frequency band. In other words using the same pressure sealing for two frequencies like the two standard bands 26 and 6 GHz. In case the waveguides are filled by PTFE, the diameter for the low frequency will be 24–25 mm and the diameter for the high frequency 6 mm. By introducing the inventive pressure sealing provided with a center conductor having a diameter of 10 mm, the larger diameter can be reduced to about 17 mm with maintained cut-off frequency. An unexpected effect with the inventive pressure sealing, i.e. providing a center conductor and thus turning the circular waveguide into annular waveguide, is that there are much fewer non-desired higher waveguide modes. Referring now to FIG. 11, which shows a general embodiment of a pressure sealing for a wide band or a multi-band antenna. The antenna is formed by a metallic support 101 having a conical opening forming a horn antenna. The support 101 is provided with an attachment flange 102 arranged to mount the antenna on the roof of the container (not shown). The horn antenna is fed by a circular waveguide partly filled with a cylindrical center conductor 103, which has a conical shape in both ends to achieve a wide-band transition. The horn is filled with a dielectric material 104, such as PTFE, which may be secured to the metallic support 101 by a threaded ring 105. The feeding of microwaves from an electronic unit (not shown) on top of the antenna is made by a waveguide 106, which is made wideband by for instance a 4-ridge construction indicated by the ridges 107. The end terminations of the center conductor 103 are shown conical but as anyone skilled in the art realize a non-conical tapering may be used to improve its performance.

Figure 12A:
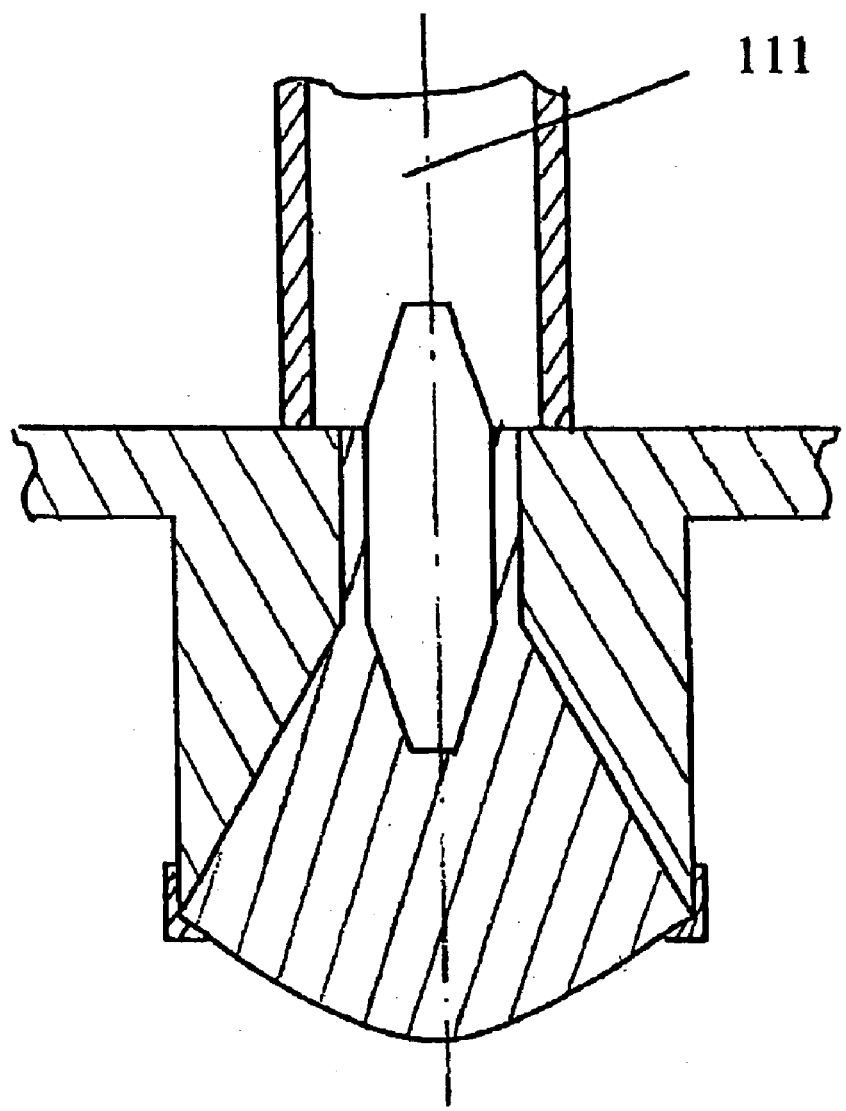
FIG. 12a shows an axial cross-section of an inventive pressure sealing fitted for a low frequency band.
Figure 12B:
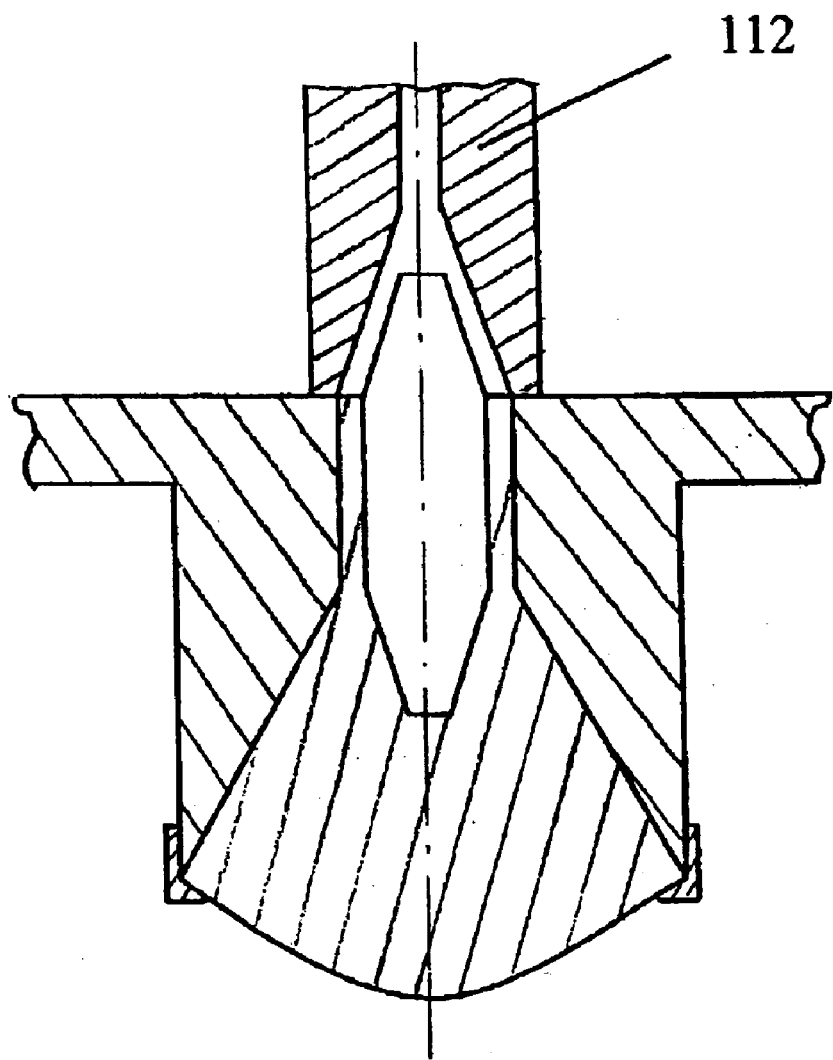
FIG. 12b shows an axial cross-section of an inventive pressure sealing fitted for a high frequency band.

FIGS. 12a and 12b show the same pressure sealing as in FIG. 11, but fitted with two different connections. FIG. 12a shows the connection for the lower frequency band, e.g. 6 GHz, and FIG. 12b shows the connection for the higher frequency band, e.g. 25 GHz. The pressure sealing arranged to seal the container is the same, which means that the electronic unit (not shown) and feeding waveguide 111, 112 can be exchanged without opening the container. As can be seen from FIG. 12a, the rather wide waveguide 111 feeding the lower frequency band is matched with the antenna waveguide. While, as can be seen from FIG. 12b, a conical transition 112 is used in the waveguide of the higher frequency to connect the upper diameter of 7–8 mm to a lower diameter of 17 mm smoothly and to transform the antenna waveguide to a normal $H_{11}$-waveguide for that frequency. The section having the coaxial structure carries much fewer modes at the high frequency band than what a conventional waveguide allowing the lower frequency band to pass would do, which greatly simplifies the creating of a clean wave-front at both frequency bands. A smooth transition to the cone makes the $H_{11}$ mode to give the desired field over the antenna aperture possibly with a kind of lens function (not shown) to keep the cone short but still giving the desired antenna function with a uniform phase front over the surface In the above described preferred embodiments of the present invention a horn antenna is used as an example. The person skilled in the art realizes, however, that the inventive pressure sealing can be used in any waveguide-fed antenna, such as a parabolic antenna, a rod-antenna etc. Further, the inventive pressure sealing is preferably intended to withstand pressure in one direction, but may be modified for bi-directional locking. The locking to sustain a low pressure in the tank is normally rather small (max 1 bar pressure difference) and can be done in many ways. If the waist is not used for this purpose a few radial fastening elements, such as screws (typically four), can be used or a spring locking into circumferential grooves. Another obvious use of the inventive sealing is as an explosion proof sealing within the same waveguide chain from electronics to antenna.

In the following will be described a method for maintaining a cut-off frequency with a decreased cross-section in a pressure sealing device used in a radar level gauging system for gauging a filling level of a product kept in a container, the sealing device comprises a waveguide for feeding microwaves in at least one of the following mode types: transverse electric mode, transverse magnetic mode or hybrid mode, a solid dielectric material arranged to seal said waveguide, according to any one of the above described embodiments, comprising the step of providing a center conductor arranged at least partially in said dielectric material.

In a further embodiment the method comprises the step of providing at least one impedance transformer section arranged at one of the ends of said center conductor and preferably two transformer sections being approximately λ/4 long each arranged at the opposing ends of said center conductor.

In a yet further embodiment the method further comprises the step of providing a center conductor having a smooth envelope surface.

In a still further embodiment the method comprises the step of providing a center conductor having an envelope surface provided with grooves.

In an additional embodiment the method comprises the steps of providing at least one O-ring, preferably two being arranged λ/4 apart.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure sealing device in a radar level gauging system for gauging a filling level of product kept in a container, the sealing device comprises:
    a waveguide for feeding microwaves;
    a solid dielectric material arranged to seal said waveguide; and
    a center conductor partially extending through said dielectric material.

2. The pressure sealing device according to claim 1, wherein the waveguide has a circular radial cross-section.

3. The pressure sealing device according to claim 1, wherein the waveguide has a rectangular radial cross-section.

4. The pressure sealing device according to claim 1, wherein said waveguide comprises a section having a smaller radial cross-section than the rest of the waveguide, which section is arranged to mechanically clamp said dielectric material and wherein said center conductor is arranged in the section of the waveguide having the smaller radial cross-section.

5. The pressure sealing device according to claim 4, wherein said center conductor has essentially the same length as said section of the waveguide having the smaller radial cross-section, which length is approximately λ/2 of the actual waveguide wavelength.

6. The pressure sealing device according to claim 1, further comprising at least one impedance transformer section arranged at least at one of the ends of said center conductor.

7. The pressure sealing device according to claim 6, wherein two impedance transformer sections being approximately λ/4 long each are arranged at the opposing ends of said center conductor.

8. The pressure sealing device according to claim 1, wherein the solid dielectric material is at least one of the following materials: PTFE, PPS, quartz, glass or a ceramic material.

9. The pressure sealing device according to claim 1, wherein said center conductor has a smooth envelope surface.

10. The pressure sealing device according to claim 1, wherein the envelope surface of said center conductor is provided with grooves.

11. The pressure sealing device according to claim 1, further comprising at least one O-ring.

12. The pressure sealing device according to claim 11, comprising two O-rings being arranged λ/4 apart.

13. The pressure sealing device according to claim 1, wherein at least the envelope surface of said center conductor is made of a metal.

14. A radar level gauge for gauging a filling level of a product kept in a container comprising:
    a microwave antenna unit directable into the container;
    a microwave source for sending a microwave signal through the antenna unit into the container;
    a microwave receiver for receiving a reflected microwave signal from the surface of the product in the container;
    measurement circuitry coupled to the source and receiver for initiating transmission of the microwave signal and for determining product level based upon the received signal;
    a waveguide for feeding the microwaves between said source/receiver and said antenna;
    a solid dielectric material arranged to seal said waveguide; and
    a center conductor partially extending through said dielectric material.

15. The radar level gauge according to claim 14, further comprising a communication interface for sending and receiving information.

16. The radar level gauge according to claim 14, wherein said level gauge is arranged to transmit and receive microwaves on at least a first and a second frequency band, and wherein the center frequency of the second frequency band is at least 1.5 times higher than the frequency center of the first frequency band.

17. The radar level gauge according to claim 16, wherein the center frequency of the second frequency band is at least 2 times higher than the frequency center of the first frequency band.

18. The radar level gauge according to claim 14, wherein the waveguide has a circular radial cross-section.

19. The radar level gauge according to claim 14, wherein the waveguide has a rectangular radial cross-section.

20. The radar level gauge according to claim 14, wherein said waveguide comprises a section having a smaller radial cross-section than the rest of the waveguide, which section is arranged to mechanically clamp said dielectric material and wherein said center conductor is arranged in the section of the waveguide having the smaller radial cross-section.

21. The radar level gauge according to claim 20, wherein said center conductor has essentially the same length as said section of the waveguide having the smaller radial cross-section, which length is approximately λ/2 of the actual waveguide wavelength.

22. The radar level gauge according to claim 14, further comprising at least one impedance transformer section arranged at least at one of the ends of said center conductor.

23. The radar level gauge according to claim 22, wherein two impedance transformer sections being approximately λ/4 long each are arranged at the opposing ends of said center conductor.

24. The radar level gauge according to claim 14, wherein the solid dielectric material is a least one of the following materials: PTFE, PPS, quartz, glass or a ceramic material.

25. The radar level gauge according to claim 14, wherein said center conductor has a smooth envelope surface.

26. The radar level gauge according to claim 14, wherein the envelope surface of said center conductor is provided with grooves.

27. The radar level gauge according to claim 14, further comprising at least one O-ring.

28. The radar level gauge according to claim 27, comprising two O-rings being arranged u4 apart.

29. The radar level gauge according to claim 14, wherein at least the envelope surface of said center conductor is made of a metal.

30. A method for implementing a pressure sealing device in a waveguide used in a radar level gauging system for gauging a filling level of a product kept in a container; the sealing device comprises a solid dielectric material arranged to seal said waveguide, the method comprising the steps of:
arranging a decreased cross section of said waved guide to clamp said solid dielectric material,
providing a center conductor at least partially extending through said dielectric material and
matching the diameter of said center conductor to said decreased cross section to approximately maintain the cut-off frequency of the waveguide.

31. The method according to claim 30, further comprising the step of providing at least one transformer section arranged at one of the ends of said center conductor.

32. The method according to claim 31, further comprising providing two transformer sections being approximately λ/4 long each arranged at the opposing ends of said center conductor.

33. The method according to claim 30, further comprising providing a center conductor comprising a smooth envelope surface.

34. The method according to claim 30, further comprising providing a center conductor comprising an envelope surface provided with grooves.

35. The method according to claim 30, further comprising providing at least one O-ring, preferably two O-rings being arranged λ/4 apart.

* * * * *